(12) United States Patent
Gilliland et al.

(10) Patent No.: US 6,445,867 B1
(45) Date of Patent: Sep. 3, 2002

(54) OPTICAL FIBER HERMETIC TERMINATION CONNECTOR

(75) Inventors: Patrick B. Gilliland, Chicago; Gregg Rapala, Arlington Heights; Sean Cho, Elgin, all of IL (US)

(73) Assignee: Stratos Lightwave, Inc., Chicago, IL (US)

( * ) Notice: Subject to any disclaimer, the term of this patent is extended or adjusted under 35 U.S.C. 154(b) by 22 days.

(21) Appl. No.: 09/626,034

(22) Filed: Jul. 27, 2000

(51) Int. Cl.$^7$ ................................................ G02B 6/00
(52) U.S. Cl. ...................................... 385/138; 385/134
(58) Field of Search ............................ 385/138, 56, 58, 385/60, 139

(56) References Cited

U.S. PATENT DOCUMENTS

| | | | | |
|---|---|---|---|---|
| 4,822,130 A | * | 4/1989 | Maranto et al. ............. | 385/138 |
| 4,859,021 A | * | 8/1989 | Wall ............................ | 385/138 |
| 5,155,795 A | * | 10/1992 | Wasserman et al. ......... | 385/138 |
| 5,237,825 A | * | 8/1993 | Menzi et al. ................. | 62/51.1 |
| 5,399,442 A | * | 3/1995 | Shundo ........................ | 429/32 |
| 5,588,086 A | * | 12/1996 | Fan ............................. | 385/138 |
| 5,896,479 A | | 4/1999 | Vladic ......................... | 385/59 |
| 6,045,270 A | | 4/2000 | Weiss et al. .................. | 385/59 |

OTHER PUBLICATIONS

Methode Electronics, Inc., Data Sheet, "808 Series MP $^{TM}$ Fiber Optic Ribbon Interconnect System," (2 pages), Aug. 1999.

* cited by examiner

Primary Examiner—Hemang Sakghavi
Assistant Examiner—Scott Knauss
(74) Attorney, Agent, or Firm—Karl D. Kovach

(57) ABSTRACT

A connector for mounting to and through a wall of a device. In one form of the invention a connector is used for mounting to and through a wall of a device. The connector includes a body, an optical fiber, and a sealant. The body includes a surface having an aperture. The optical fiber has a length and a first end and a second end. A portion of the length of the optical fiber being metallized. The optical fiber passes through the aperture of the surface of the body and the metallized portion of the optical fiber is attached to the aperture of the surface of the body so as to form a hermetic seal between the optical fiber and the aperture of the surface of the body. The sealant is located between the body and the surface of the device so as to provide a hermetic seal between the body and the wall of the device when the body is urged toward the wall of the device thus deforming the sealant. The connector allows an optical signal to be transmitted within the optical fiber through the body. The connector, at the first end of the optical fiber, is adapted so as to receive a second optical fiber where the second optical fiber and the optical fiber communicate with each other. The connector, at the second end of the fiber, is adapted so as to receive a third optical fiber where the third optical fiber and the optical fiber communicate with each other. Therefore, the second optical fiber communicates with the third optical fiber. A method of making the connector is also disclosed.

11 Claims, 9 Drawing Sheets

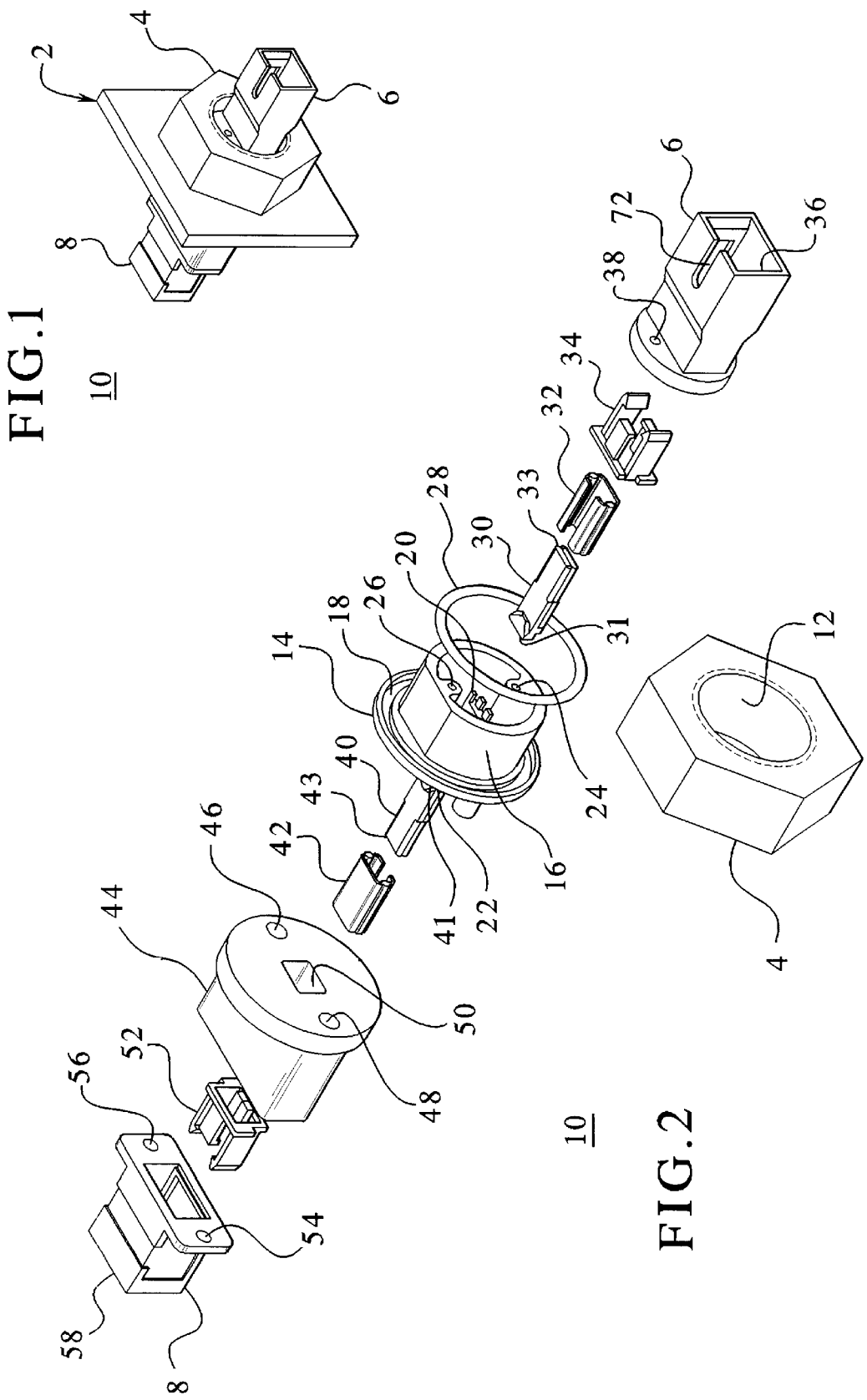

OPTICAL FIBER HERMETIC TERMINATION CONNECTOR

BACKGROUND OF THE INVENTION

1. Field of the Invention

The present invention relates to a connector which provides a hermetic seal. The invention more particularly concerns a connector for the termination of an optical fiber where the connector includes sealing material.

2. Discussion of the Background

Fundamental to the understanding of the universe is the discovery of sub-atomic particles and the forces which bind the sub-atomic particles together to form a nucleus of an atom. In order to separate the sub-atomic particles from each other the nucleus is propelled toward another nucleus, or an ion or neutron at high speeds or is projected toward some other dense object. The energy of the collision overcomes the forces that bind the sub-atomic particles together. Once the binding force has been overcome, the sub-atomic particles are displaced and move at a speed along trajectories that are functions of the mass of the sub-atomic particles and the forces applied to them. Scientists study the trajectories. The trajectories provide clues to the structure of the atom and the forces that keep the atom stable. Such knowledge is believed to shed light on the creation of the universe and in particular the big bang theory of creation.

Careful study and analysis of trajectories of sub-atomic particles can be corrupted by the influences of the measurement devices used to track the sub-atomic particles. The mere presence of the measurement devices can alter the amount of information collected since the mass of the measurement devices can absorb the sub-atomic particles and thus they are not tracked or are partially tracked. Furthermore, the electromagnetic fields created by electrical current flowing through copper cables can influence the trajectories of the sub-atomic particles, thus introducing error into the amount and types of forces being unleashed when the sub-atomic particles scatter. Furthermore, the energy released by the collision may corrupt the electromagnetic electrical signal being transmitted along the copper cable. Another problematic situation occurs when the sub-atomic particles impact elements such as oxygen and nitrogen which exists in the air, the trajectory of the sub-atomic particles are artificially altered rendering the collected data less useful than would otherwise be the case.

Additionally, many of the sub-atomic particles decay and vanish in a very short period of time. As such, the devices sensing the experiment must collect as much data as possible during a short period of time.

In order to reduce the known sources of error, the tests are conducted in a substantial vacuum so as to eliminate the atmospheric elements, small mass measurement devices are employed so as to reduce the effect of mass, and copper cabling has been shielded so as to reduce the impact of electromagnetic interference.

Furthermore, in some applications, copper cabling has been replaced with optical fiber. In such an application, data is transmitted by light along the optical fiber. Transmitting data with light conveyed within a glass fiber instead of electricity conveyed along copper cabling eliminates the effects of electromagnetic interference on the collected data since light travelling in a fiber is not subject to and does not emanate electromagnetic fields as does electricity flowing through copper cables. Additionally, the use of fiber optics allows for high speed data transmission so as to capture as much data as possible during a short time frame. Thus, another source of error is eliminated.

The optical fiber is introduced into the vessel via a feed-through tube. The feed-through tube is a metallic tube welded to the wall of the vessel. The weld provides a permanent hermetic seal at the interface between the vessel and the feed-through tube. However, initially, the optical fiber is metallized. Then a portion of the metallized optical fiber is passed through the feed-through tube and is soldered to the metallic feed-through tube so as to provide a hermetic seal between the optical fiber and the feed-through tube. Thus, the optical fiber is permanently attached to the vessel. Unfortunately, the level of skill required to solder the metallized optical fiber to the feed-through tube is not commonly possessed. Thus, the installation costs are high. Additionally, the permanent attachment of the optical fiber to the feed-through tube makes it difficult to interchange components and to access the interior of the device.

Therefore, there is a need for a hermetic seal between a fiber optic cable and a wall of a detector which is easy to install and uninstall, easy to use, and is inexpensive to produce.

SUMMARY OF THE INVENTION

In light of the related art as described above, one of the main objectives of the present invention is to provide a means of data transmission which does not rely on copper cabling. The connector of the invention employs an optical fiber which transmits data with light.

A further object of the present invention is to provide a connector for optical fibers and devices.

Yet another object of the present invention is to provide a connector which seals to a surface of a device or chamber.

Still another object of the present invention is to provide a connector having a seal which has a body that accepts an MP fiber optic connector.

Another objective of the present invention is to provide a connector which eliminates spurious electromagnetic emissions from leaking from the connector.

Yet still another object of the invention is to provide a connector which transmits data at high rates of speed.

Another objective of the present invention is to provide a connector which provides a hermetic seal at both high and low temperatures.

It is another object of the invention to provide a connector which is inexpensive to manufacture.

It is still yet another object of the invention to provide a connector which is able to mount to and seal a vessel, where the vessel is made of a non-magnetic material.

It is a further object of the invention to provide a connector which is easy to assemble in the field.

It is another object of the invention to provide a connector which employs standard parts and features.

Another object of the invention is to provide a connector which is small so as to reduce mass.

In one form of the invention a connector is used for mounting to and through a wall of a device. The connector includes a body, an optical fiber, and a sealant. The body includes a surface having an aperture. The optical fiber has a length and a first end and a second end. A portion of the length of the optical fiber being metallized. The optical fiber passes through the aperture of the surface of the body and the metallized portion of the optical fiber is attached to the aperture of the surface of the body so as to form a hermetic seal between the optical fiber and the aperture of the surface of the body. The sealant is located between the body and the surface of the device so as to provide a hermetic seal between the body and the wall of the device when the body is urged toward the wall of the device thus deforming the sealant. The connector allows an optical signal to be transmitted within the optical fiber through the body. The connector, at the first end of the optical fiber, is adapted so as to receive a second optical fiber where the second optical fiber and the optical fiber communicate with each other. The connector, at the second end of the fiber, is adapted so as to receive a third optical fiber where the third optical fiber and the optical fiber communicate with each other. Therefore, the second optical fiber communicates with the third optical fiber.

In another form of the invention a connector is used for mounting to and through a wall of a device. The connector includes a body, an optical fiber, and a sealant. The body includes a surface having an aperture. The optical fiber has a length and a first end and a second end. The optical fiber passes through the aperture of the surface of the body and the optical fiber is attached to the aperture of the surface of the body so as to form a seal between the optical fiber and the aperture of the surface of the body. The sealant is located between the body and the surface of the device so as to provide a hermetic seal between the body and the wall of the device when the body is urged toward the wall of the device thus deforming the sealant. The connector allows an optical signal to be transmitted within the optical fiber through the body. The connector, at the first end of the optical fiber, is adapted so as to receive a second optical fiber where the second optical fiber and the optical fiber communicate with each other. The connector, at the second end of the fiber, is adapted so as to receive a third optical fiber where the third optical fiber and the optical fiber communicate with each other. Therefore, the second optical fiber communicates with the third optical fiber.

In yet another form of the invention a method is disclosed for making the connector. The method includes the steps of metallizing, attaching, adpating, and urging. The step of metallizing inlcudes metallizing a portion of the length of a first optical fiber so as to form a metallized portion, the first optical fiber having a first end and a second. The step of attaching inlcudes attaching the metallized portion of the first optical fiber to an aperture of a body so as to form a first hermetic seal between the first optical fiber and the aperture of the body. One of the steps of adapting includes adapting the connector at the first end of the first optical fiber so as to receive a second optical fiber where the second optical fiber and the first optical fiber are in optical communication. A second step of adapting includes adapting the connector at the second end of the first optical fiber so as to receive a third optical fiber where the third optical fiber and the first optical fiber are in optical communication. The step of urging includes urging the body toward the wall of the device so as to deform a sealant located between the body and the wall of the device thereby forming a second hermetic seal between the body and the wall of the device.

Thus, the invention provides a connector which maintains a hermetic seal and connects with optical fibers. The invention eliminates the electromagnetic interference problems associated with copper cabling. Furthermore, the connector is easy to manufacture and to install and uninstall, and is inexpensive to produce. These and other features of the invention are set forth below.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a perspective view of the optical fiber hermetic termination connector of the invention mounted to and through a wall of a device;

FIG. 2 is an exploded, perspective view of the connector of FIG. 1 with the wall removed;

DETAILED DESCRIPTION OF THE PRESENTLY PREFERRED EMBODIMENT

Figure 3:
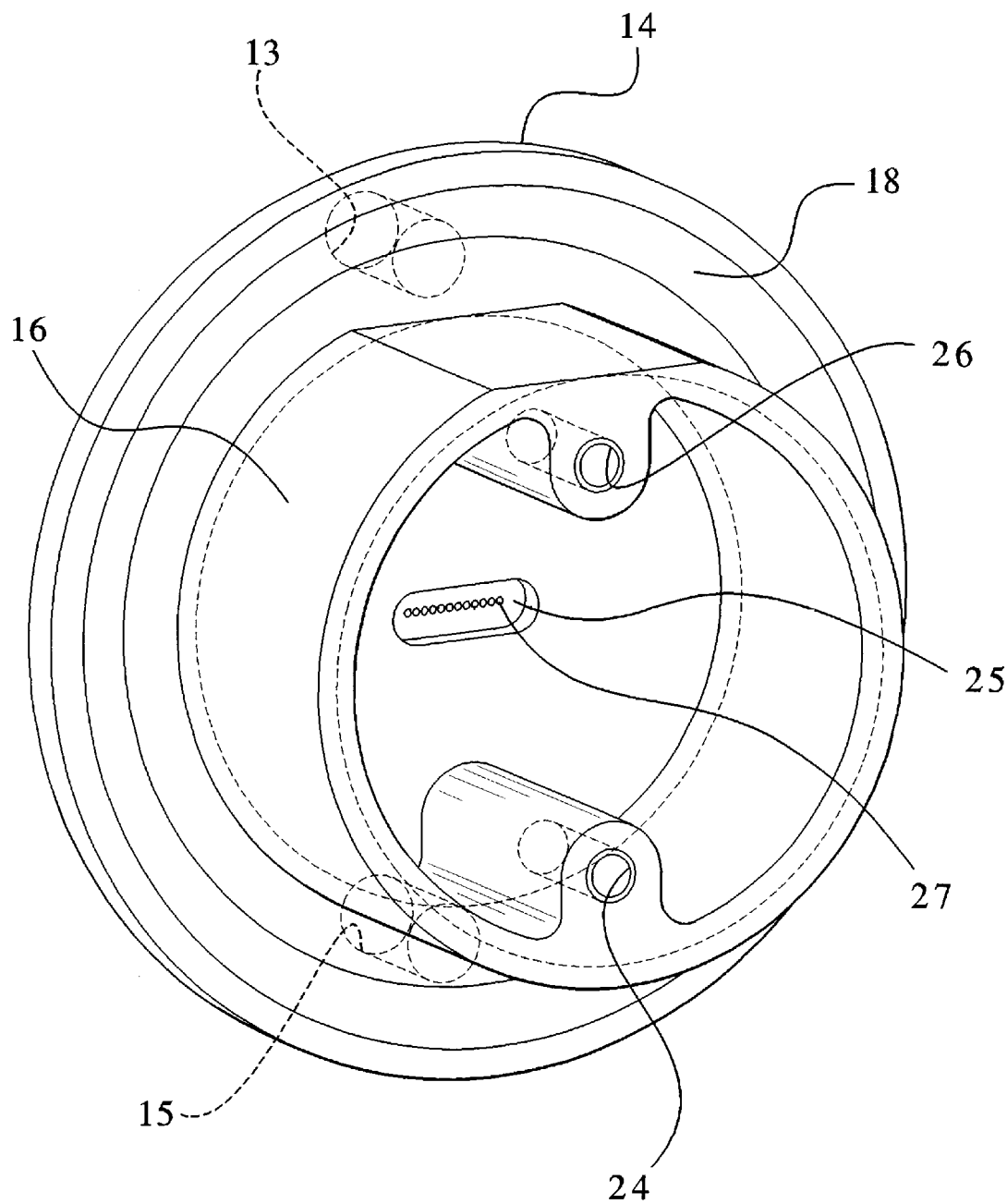
FIG. 3 is a perspective view of the body of the connector of FIG. 1 with the ferrule receiving structure removed.

Referring now to the drawings, wherein like reference numerals designate identical or corresponding parts throughout the several views, and more particularly to FIGS. 1–11, an embodiment of the present invention is an optical fiber hermetic termination connector 10.

FIG. 1 is a perspective view of the hermetic connector 10 of the invention mounted to and through a wall 2 of a device. Also shown are a nut 4, a first coupling housing 6, and a second coupling housing 8. The wall 2 may belong to a device or chamber where atmospheric conditions exist on one side of the wall 2 and a vacuum exists on the other side of the wall 2. The connector 10 seals the opening in the wall 2 while allowing data to be transferred through the wall 2.

FIG. 2 is an exploded perspective view of the connector 10 with the wall 2 removed. A body 14 includes an O-ring groove 18. The O-ring groove 18 being substantially filled with an O-ring 28. The body 14 further has a threaded region 16. The nut 4 has a threaded region 12 which is complimentary to and mates with the threaded region 16 of the body 14. The body 14 further includes threaded bores 24, 26, and ferrule receiving structures 22, 20.

A first ferrule 30 has a first end 31 and a second end 33. The first end 31 of the first ferrule 30 connects to the ferrule receiving structure 20. The ferrule 30 houses at least one optical fiber. Typically the ferrule 30 houses eight optical fibers and in practice can contain twelve optical fibers.

An alignment sleeve 32 slips around the ferrule 30. The ferrule 30, when attached to the alignment sleeve 32, is positioned approximately halfway along the length of the alignment sleeve 32. The alignment sleeve 32 has an opening through which the first ferrule 30 is introduced. The opening of the alignment sleeve 32 has a size which is smaller then the size of the first ferrule 30. Thus, upon introduction of the first ferrule 30 into the alignment sleeve 32, the alignment sleeve 32 expands so as to accept the relatively rigid first ferrule 30. In such an assembly, the alignment sleeve 32 holds the first ferrule 30 in a state of compression.

The first end 31 of the first ferrule 30 mounts to the ferrule receiving structure 20 on the body 14. The ferrule receiving structure 20 holds the first ferrule 30 in-place by way of a press or compression fit. (See FIG. 8.) A first latch 34 slides, with clearance, over the alignment sleeve 32 and the first ferrule 30. (See FIG. 8.) The coupling housing 6 has a receiving portion 36 and a bore 38 and another bore which is not shown. The bore 38 aligns with the threaded bore 26 and the unseen bore of the coupling housing 6 aligns with the threaded bore 24 of the body 14. During assembly, a socket head cap screw is received through the bore 38 and threadedly engaged with the threaded bore 26, and another socket head cap screw, likewise, aligns the unseen bore and the threaded bore 24 so as to secure the components to the body 14. (See FIG. 7.) The first latch 34 is secured between the coupling housing 6 and the body 14.

Located near an outer side of the wall 2 (i.e., the side of the chamber which has a pressure higher than on the other side of the wall 2) of the chamber or device is a second ferrule 40. The second ferrule 40 has a first end 41 and a second end 43. The first end 41 of the second ferrule 40 is received in a ferrule receiving structure 22 of the body 14 which is similar to the assembly procedure described above in regard to the first ferrule 30. Likewise, an alignment sleeve 42 partially covers the second ferrule 40. The second ferrule 40, similar to the ferrule 30, also, contains the optical fibers held by the ferrule 30.

Figure 5:
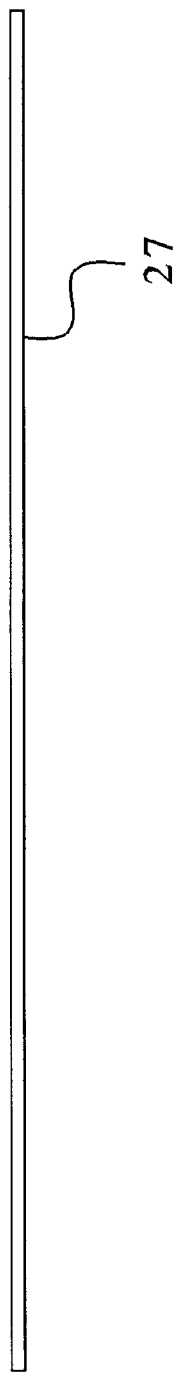
FIG. 5 is a side view of an optical fiber.
Figure 6:
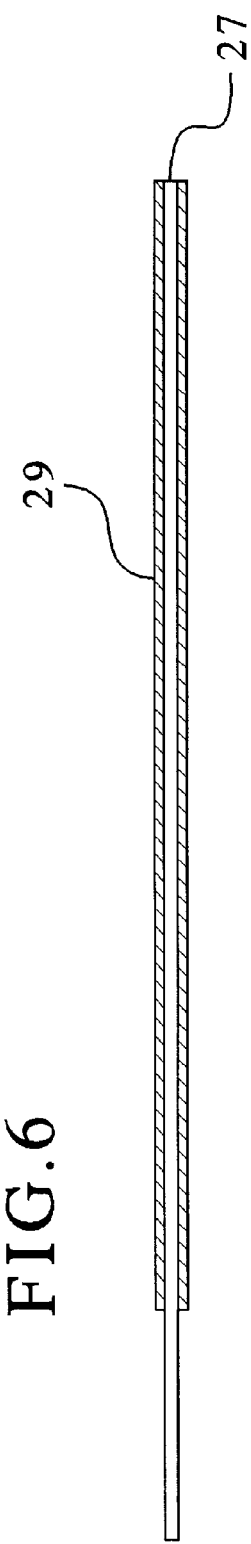
FIG. 6 is a side view of the optical fiber of FIG. 4 where the glass fiber portion is metallized.

FIG. 5 is a side view of an optical fiber 27, contained in the second ferrule 40 (not shown), with a layer of insulation (not shown) stripped away. The optical fibers are positioned on one half of the ferrule along with an adhesive, then the other half of the ferrule is mounted to the other one half ferrule so as to sandwich the optical fiber. The optical fibers are positioned so as to slightly extend past the second end 43 of the ferrule 40. The second end 43 of the ferrule 40 is polished so as to remove the excess material of the optical fibers extending beyond the second end 43 of the ferrule 40, thus making the optical fibers flush with the second end 43 of the ferrule 40. The optical fibers are long enough so that a generous length extends from the first end 41 of the ferrule 40. This extended length of the optical fibers are metallized. The optical fibers 27 are metallized with a metallization layer or metallized layer 29 which includes a layer of nickel over a layer of chromium as shown in FIG. 6.

Figure 4:
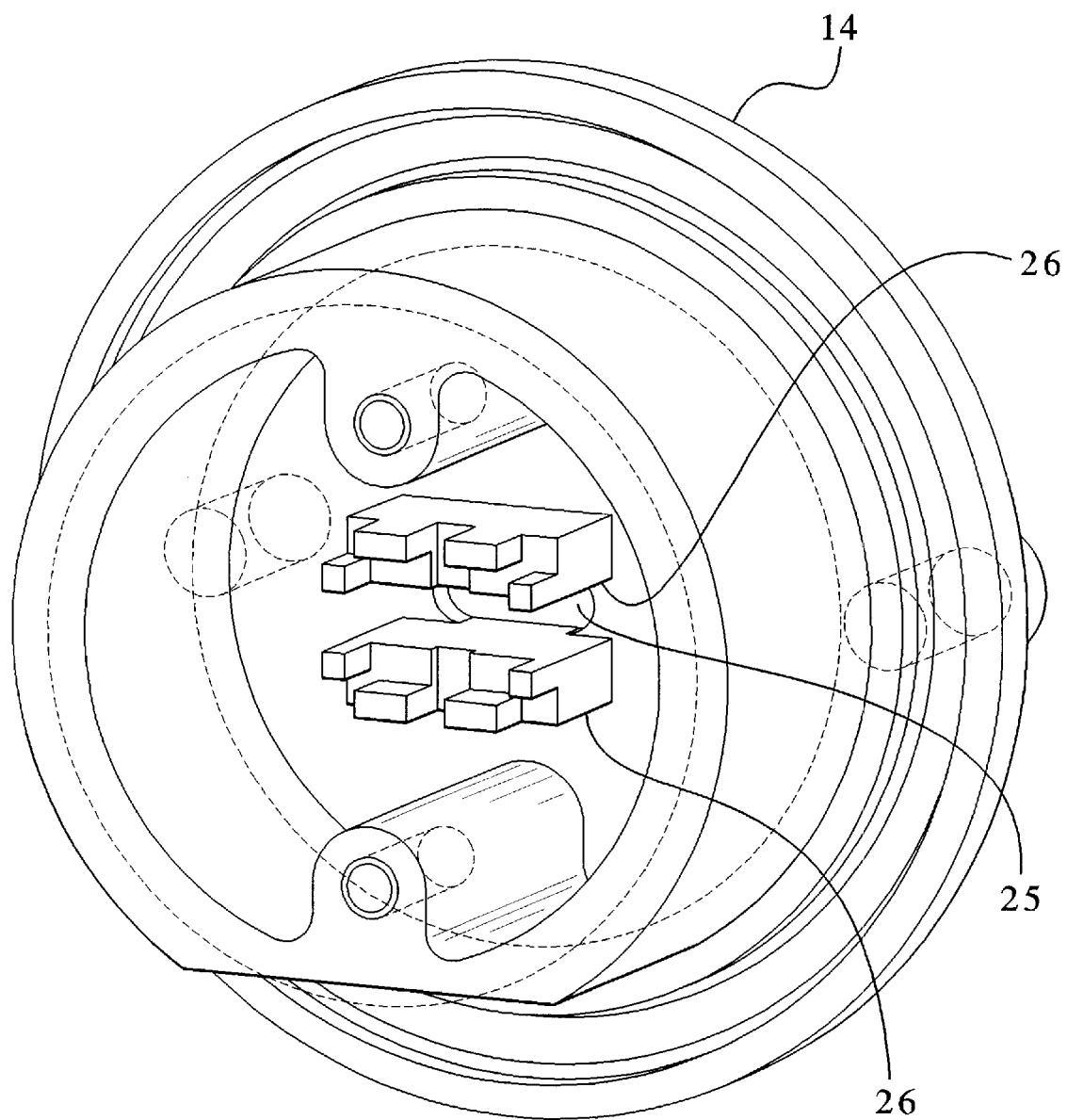
FIG. 4 is a perspective view of the body of the connector of FIG. 3 including the ferrule receiving structure.

The metallized layer 29 of the optical fibers 27 are passed through apertures in the body 14 and are soldered to the surface 25 of the body 14, as shown in FIG. 3 (for reasons of clarity the optical fibers are not shown extending beyond the surface 25), and the ferrule 40 is introduced into the ferrule receiving structure 22 and the ferrule 40 is held in place by the ferrule receiving structure 22. Thus, an optical signal passes through the body 14 along the glass material of the optical fiber 27. The soldering of the metallized layer 29 of the optical fiber 27 to the body 14 provides a hermetic seal at the location of the aperture of the surface or termination portion 25 of the body 14. Also, for reasons of clarity, the ferrule receiving structure 26 is not shown in FIG. 3. In another embodiment, the multiple apertures of the surface 25 can be replaced with a single slot which is subsequently filled-up with solder material so as to form the hermetic seal between the optical fibers and the body 14. FIG. 4 is a perspective view of the body 14 of FIG. 3 including the ferrule receiving structure 26 and the surface 25.

Alternatively, the metallization of the fibers 27 may be omitted. In such an embodiment, a low temperature sealing glass may be introduced and reflowed around the fibers to effect the hermetic seal. Also, an epoxy sealant may be used instead of the sealing glass. Use of the epoxy produces a fine leak seal rather than performing as a true hermetic seal.

Next, the optical fibers extending through the body 14 are trapped between two halves of the first ferrule 30 which are held together with an adhesive. The first ferrule 30 is assembled so as to be situated in ferrule receiving structure 26. The optical fibers 27 contained within the ferrule 30 may or may not be metallized. The portions of the optical fibers 27 extending beyond the second end 33 of the first ferrule 30 are trimmed and polished so as to be flush with the second end 33 of the ferrule 30. (See FIGS. 10 and 11.)

Returning to FIG. 2, a housing 44 has an aperture 50 which slides over the alignment sleeve 42 and the ferrule 40. The housing 44 also has through holes 46, 48. A second latch 52 is trapped between the housing 44 and the coupling housing 8. The second coupling housing 8 has through holes 54, 56 which align, respectively, with through holes 48, 46. The coupling housing 8 also has a receiving port 58. The coupling housing 8 and the housing 44 are attached to the body 44 by two socket head cap screws 64, 66 (See FIG. 7) which attach to the bores 54, 48 and 56, 46 and which terminate in threaded bores 13, 15 (See FIG. 3) of the body 14.

FIG. 3 is a perspective view of the body 14 of the connector 10. FIG. 3 further shows the threaded portion 16, the threaded bores 13, 15 which are situated on the outer chamber or atmospheric side of the wall 2 of the testing device, and threaded bores 24, 26 which exist, once assembled, on the interior or vacuum side of the chamber. The body 14 has an O-ring groove 18 and a surface 25.

Figure 7:
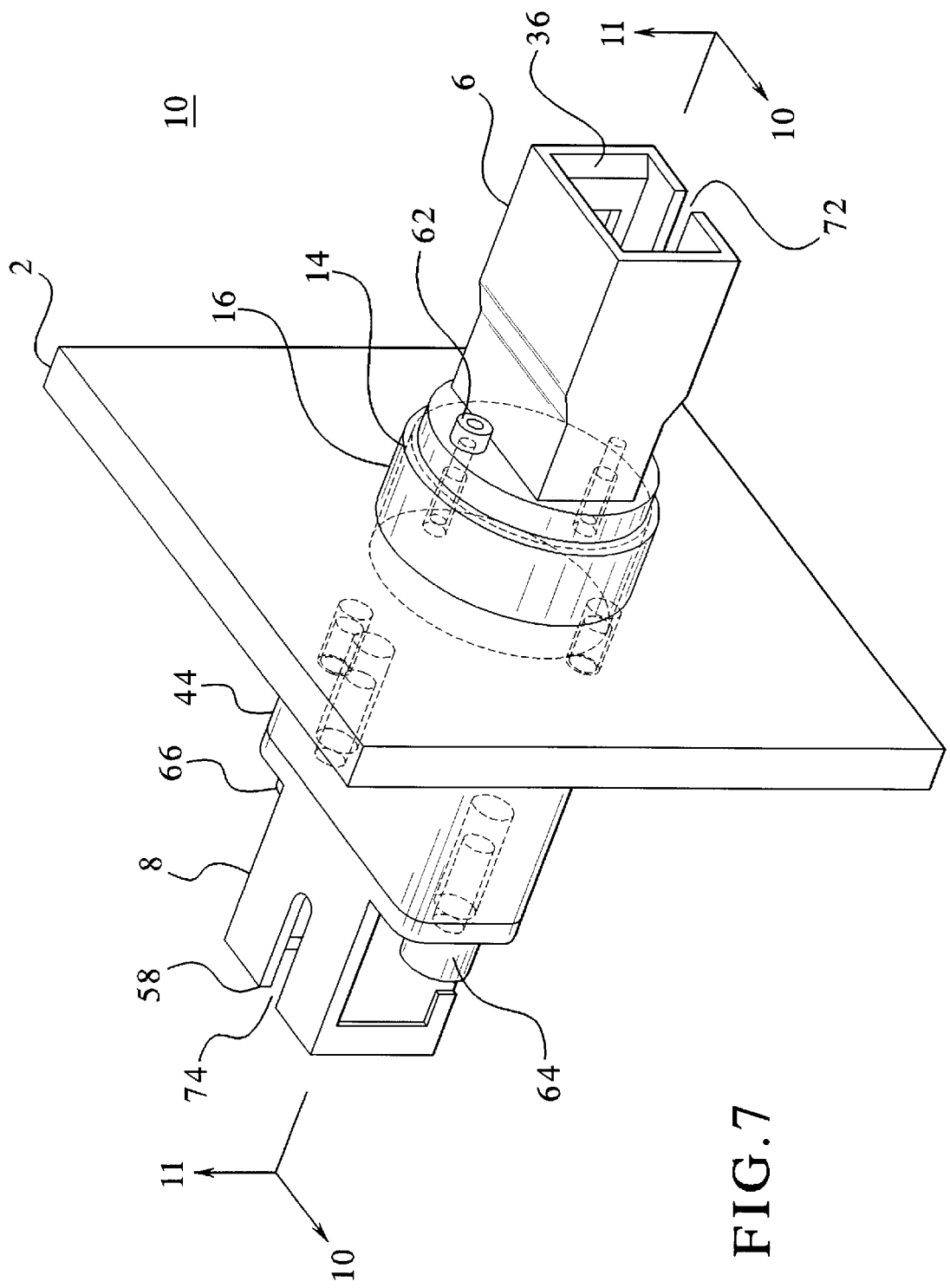
FIG. 7 is a perspective view of the connector of FIG. 1 with the nut removed.

FIG. 7 is a perspective view of the connector 10 of FIG. 1 with the nut 4 removed. FIG. 7 shows the threaded portion 16 of the body 14 protruding through an opening of the wall 2 of the chamber. Also shown is a socket head cap screw 62 securing the coupling housing 6 to the body 14. Also shown a socket head cap screw 64 and a portion of the socket head cap screw 66 securing the coupling housing 8 and the housing 44 to the body 14. In this view, the connector 10 has been rotated 180 degrees along a longitudinal axis of the connector 10 as compared to FIGS. 1 and 2. Note the location of keying slots 72, 74 for reference.

Turning to FIG. 2, when both the first ferrule 30 and the second ferrule 40 are attached to the body 14, optical communication is achieved from the second end 43 of the second ferrule 40 to the second end 33 of the first ferrule 30 via the optical fibers 27.

In practice, when the body 14 holding the O-ring 28 is urged or pushed toward the wall 2, the O-ring becomes deformed which provides a seal between the body 14 and the wall 2 of the test device or chamber. The body 14 maintains its position adjacent to the wall 2 by way of securing the threaded region 12 of the nut 4 to the threaded region 16 of the body 14. Without the nut 4, the remaining portion of the connector can fall out of the opening of the wall 2.

Figure 8:
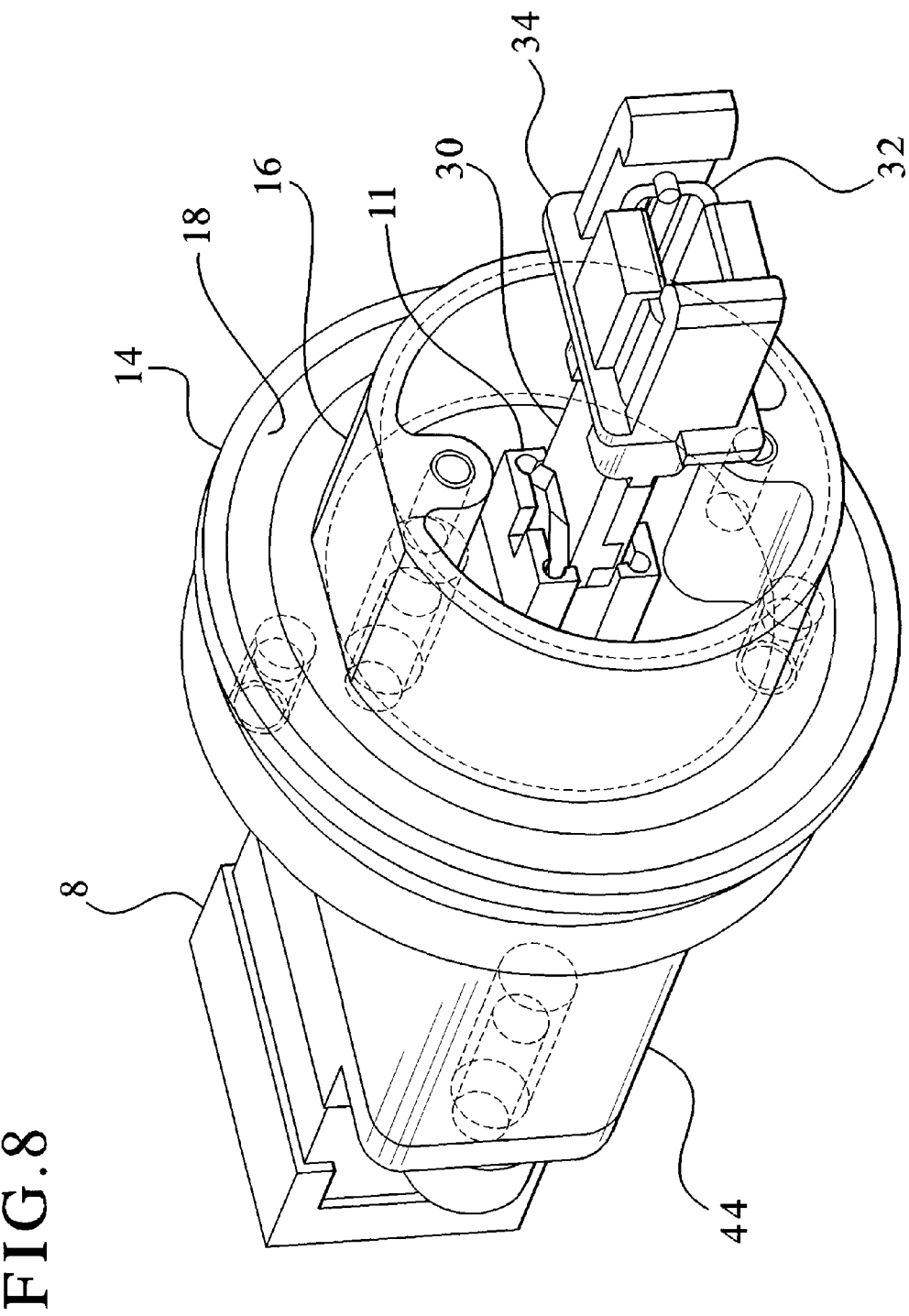
FIG. 8 is a perspective view of the connector of FIG. 6 showing details of the interaction between one of the ferrules, one of the latches, and the body.

FIG. 8 is a perspective view of the connector 10 of FIG. 7 showing details of the interaction between one of the ferrules 30, the latch 34, and the body 14 with the coupling housing 6 removed for clarity. FIG. 8 further shows the ferrule receiving structure 11 of body 14.

Figure 9:
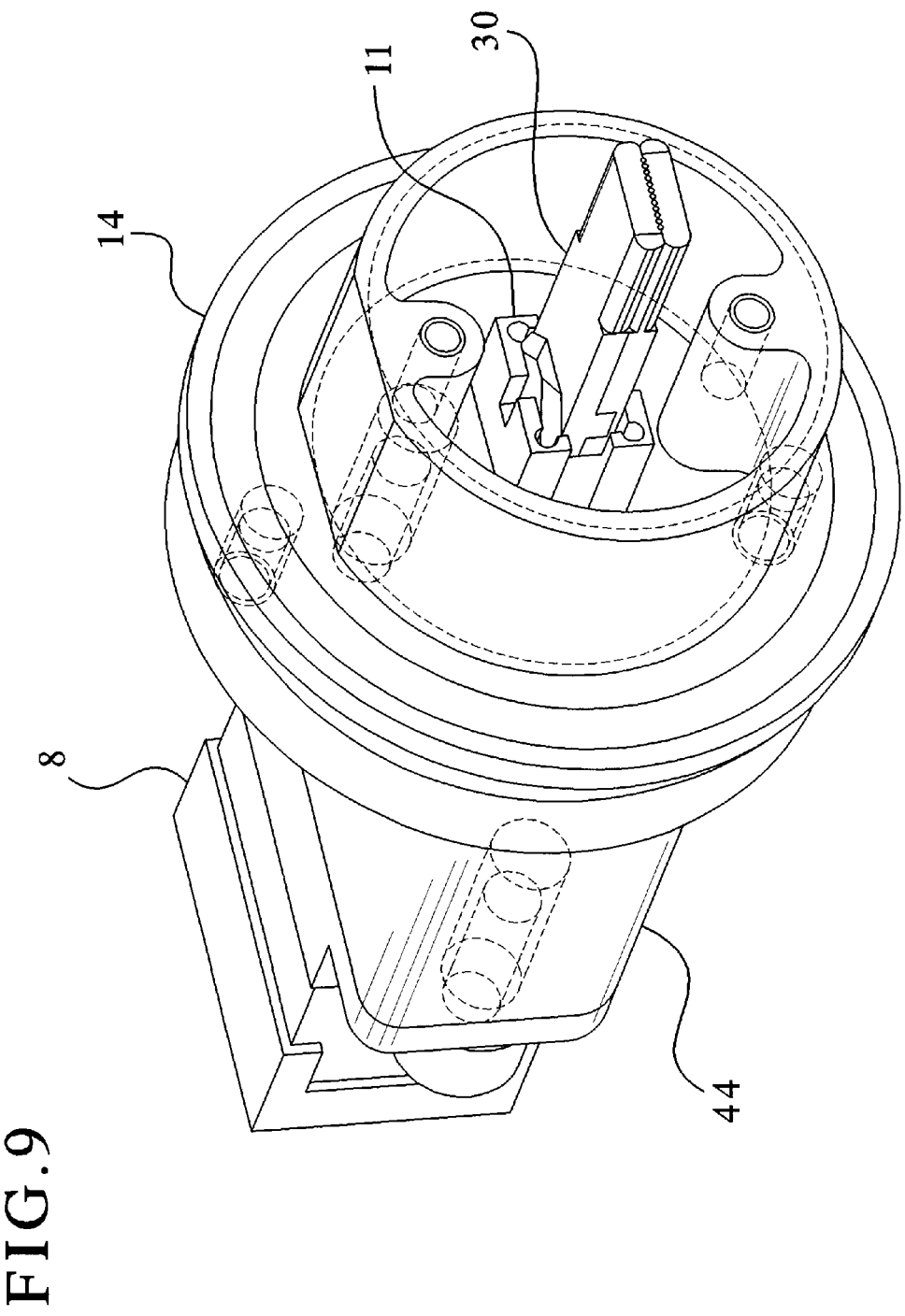
FIG. 9 is a perspective view of the connector of FIG. 7 showing details of the interaction between the ferrule and the body.

FIG. 9 is a perspective view of the connector 10 of FIG. 8 showing details of the interaction between the ferrule 30 and the ferrule receiving structure 11 of the body 14 with the latch 34 removed for clarity.

Figure 10:
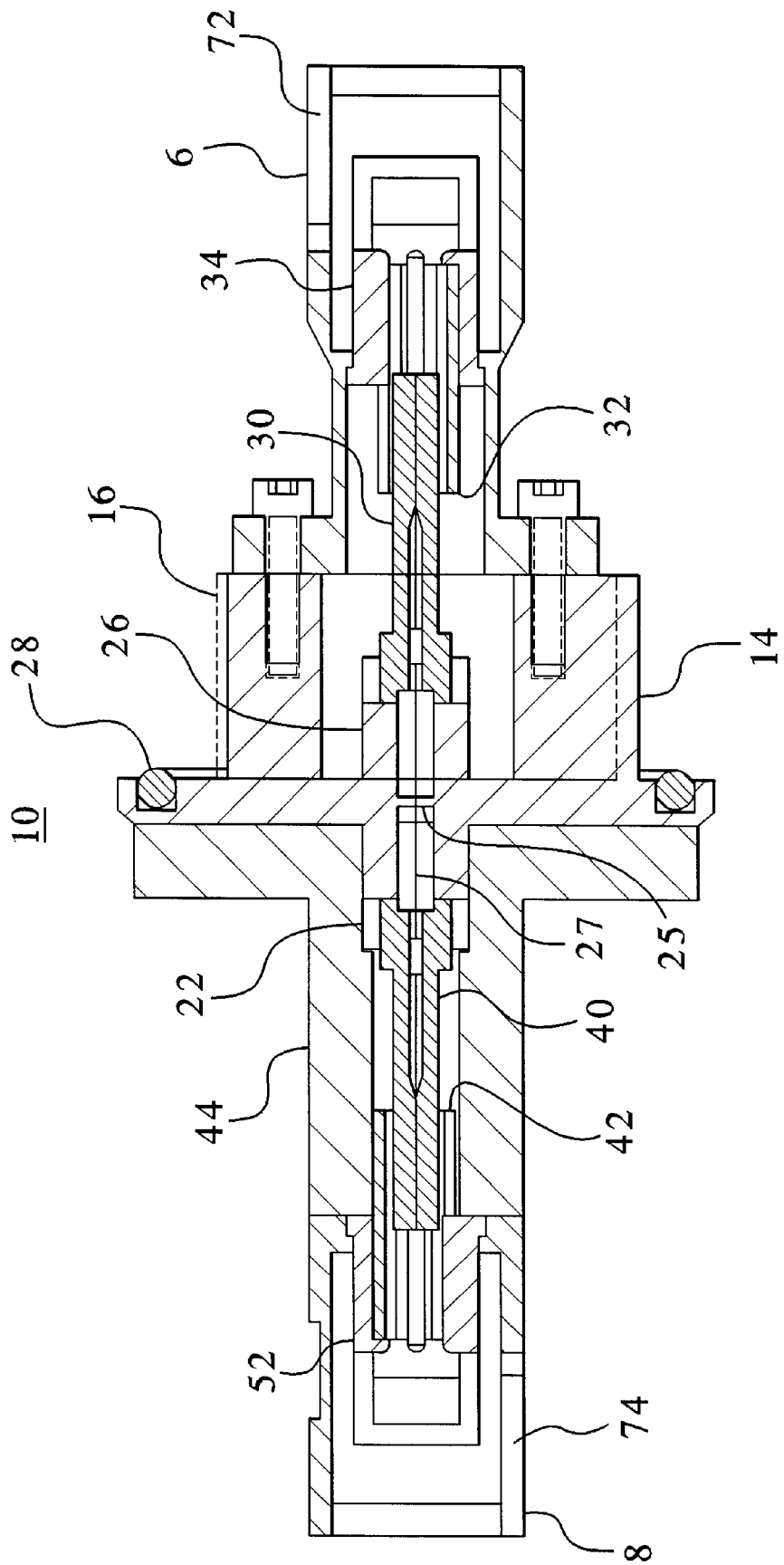
FIG. 10 is a cross-sectional side view of the connector of FIG. 7 taken along section line 10—10 including an optical fiber.

FIG. 10 is a cross-sectional side view of the connector 10 taken along section line 10—10 of FIG. 7 and rotated one-hundred-eighty degrees about an axis parallel and coincident with section line 10—10. FIG. 10 shows the optical fiber 27 housed within ferrules 30, 40 and extending through the face 25 of the body 14. Further shown are the assembled positions of the alignment sleeves 32, 42, latches 34, 52, the body 14 having the threaded 16 and ferrule receiving structures 22, 26, coupling housings 6, 8, the housing 44, and the O-ring 28.

Figure 11:
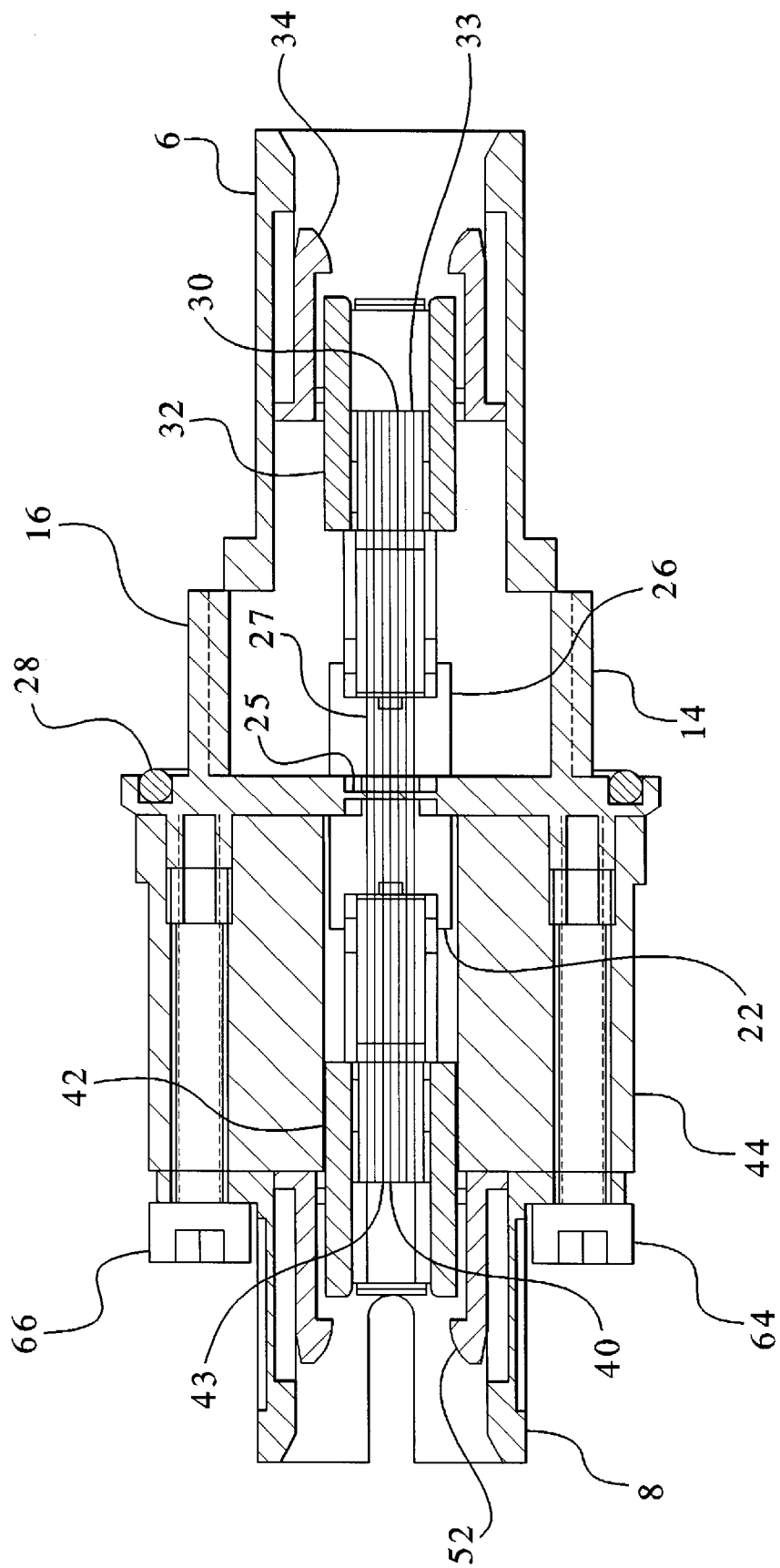
FIG. 11 is a cross-sectional side view of the connector of FIG. 7 taken along section line 11—11 including optical fibers.

FIG. 11 is a cross-sectional side view of the connector 10 taken along section line 11—11 of FIG. 7. Due to reasons of clarity only seven of the optical fibers 27 are shown, where, typically, eight or twelve optical fibers exist. FIG. 11 also shows the optical fibers 27 housed within ferrules 30, 40 and extending through the face 25 of the body 14. Further shown are the assembled positions of the alignment sleeves 32, 42, latches 34, 52, the body 14 having the threaded portion 16 and ferrule receiving structures 22, 26, coupling housings 6, 8, the housing 44, the O-ring 28, and socket head cap screws 64, 66.

The coupling housings 6, 8 are preferably made of a polymer material. The latches 34, 52, the alignment sleeves 32, 42, and the ferrules 30, 40 are made up of a polymer material. The O-ring 28 can be made of an elastomeric material or may be constructed of a metallic material, such as silver or preferably indium. The indium material is preferable in application where the temperature of the environment may be cryogenic. Indium O-rings are manufactured by Arconium of Providence, Rhode Island. Arconium is a division of Fry Technology, a Cookson Group Company.

The nut 4 and the body 14 are preferably made of a non-magnetic metallic material such as stainless steel or aluminum as well as the socket head cap screws. Other parts, such as the housing 44, are formed of a polymer. The O-ring and O-ring groove are constructed to standard sizes. Likewise, the ferrules 30, 40, the alignment sleeve 32, 42, and the latches 34, 52 are constructed of known dimensions from pre-existing parts. As an example, Stratos Lightwave, Inc., of Chicago, Ill., manufactures and markets a fiber optic cabling system known as 808 Series MP Fiber Optic Ribbon Interconnect System as shown in Methode Electronics, Inc.'s, brochure of August 1999 displaying ferrules, alignment sleeves, and couplings. Furthermore, U.S. Pat. Nos. 6,045,270, and 5,896,479 disclose MP style connectors and couplings. U.S. Pat. Nos. 6,045,270, and 5,896,479 are hereby incorporated herein by reference.

In use, a ferrule of a connector, such as an MP connector, of a device or cable (not shown) butts up against one of the ferrules 30, 40 of the connector 10 and the associated respective latch 34, 52 engages the MP connector so as to prevent the MP connector from falling out of the respective MP style receptacle 36, 58. When the MP connector is introduced into the respective receptacle 36, 58, the ferrule of the MP connector is engaged by the respective alignment sleeve 32, 42. The respective alignment sleeve 32, 42 aligns the ferrule of the MP connector with the respective second end 33, 43 of the respective ferrule 30, 40. Thus, the optical fibers of the MP connector are in optical communication with the optical fibers of the respective ferrules 30, 40. When the connector 10 has MP connectors connected to both ends of the connector 10 then the optical fibers of one MP connector are in optical communication with the optical fibers of the other MP connector.

Obviously, numerous modifications and variations of the present invention are possible in light of the above teachings. It is therefore to be understood that within the scope of the appended claims, the invention may be practiced otherwise than as specifically described herein.

What is claimed is:

1. A connector for mounting to and through a wall of a device, the connector comprising:

a body having a surface, the surface having an aperture, the body having a threaded region;

a first optical fiber having a length, the first optical fiber having a first end and a second end, a portion of the length of the first optical fiber being metallized so as to form a metallized portion, the first optical fiber passing through the aperture of the surface of the body, the metallized portion attached to the aperture of the surface of the body so as to form a hermetic seal between the first optical fiber and the aperture of the surface of the body;

a fourth optical fiber having a length, a portion of the length of the fourth optical fiber being metallized so as to form a metallized portion, the fourth optical fiber passing through the aperture of the surface of the body, the metallized portion attached to the aperture of the surface of the body so as to form a hermetic seal between the fourth optical fiber and the aperture of the surface of the body;

a fifth optical fiber having a length, a portion of the length of the fifth optical fiber being metallized so as to form a metallized portion, the fifth optical fiber passing through the aperture of the surface of the body, the metallized portion attached to the aperture of the surface of the body so as to form a hermetic seal between the fifth optical fiber and the aperture of the surface of the body;

a sixth optical fiber having a length, a portion of the length of the sixth optical fiber being metallized so as to form a metallized portion, the sixth optical fiber passing through the aperture of the surface of the body, the metallized portion attached to the aperture of the surface of the body so as to form a hermetic seal between the sixth optical fiber and the aperture of the surface of the body;

a seventh optical fiber having a length, a portion of the length of the seventh optical fiber being metallized so as to form a metallized portion, the seventh optical fiber passing through the aperture of the surface of the body, the metallized portion attached to the aperture of the surface of the body so as to form a hermetic seal between the seventh optical fiber and the aperture of the surface of the body;

an eighth optical fiber having a length, a portion of the length of the eighth optical fiber being metallized so as to form a metallized portion, the eighth optical fiber passing through the aperture of the surface of the body, the metallized portion attached to the aperture of the surface of the body so as to form a hermetic seal between the eighth optical fiber and the aperture of the surface of the body;

a ninth optical fiber having a length, a portion of the length of the ninth optical fiber being metallized so as to form a metallized portion, the ninth optical fiber passing through the aperture of the surface of the body, the metallized portion attached to the aperture of the surface of the body so as to form a hermetic seal between the ninth optical fiber and the aperture of the surface of the body;

a sealant located between the body and the wall of the device so as to provide a hermetic seal between the body and the wall of the device when the body is urged toward the wall of the device and wherein the sealant is deformed, and whereby an optical signal can be transmitted within the first optical fiber through the body, and whereby the first end of the first optical fiber is hermetically sealed from the second end of the first optical fiber when the sealant is deformed; and a nut mounted on the body so as to trap a portion of the wall of the device therebetween, the nut having a threaded region, and wherein the threaded region of the nut is complementary to and mates with the threaded region of the body, and wherein the connector, at the first end of the first optical fiber, being adapted so as to receive a second optical fiber where the second optical fiber and the first optical fiber are in optical communication, and wherein the connector, at the second end of the first optical fiber, being adapted so as to receive a third optical fiber where the third optical fiber and the first optical fiber are in optical communication, and whereby the second optical fiber and the third optical are in optical communication when the second optical fiber and the first optical fiber are in optical communication and the first optical fiber and the third optical fiber are in optical communication, and wherein the body includes a groove, the groove circumscribes the aperture of the surface of the body, and wherein the sealant substantially lies in the groove, and wherein the sealant is an O-ring, and wherein the body has a cylindrically shaped portion, the cylindrically shaped portion of the body has a diameter equal to or less than one inch, and wherein the connector, near the first end of the first optical fiber, being adapted so as to receive a MP connector, and wherein the first optical fiber, the fourth optical fiber, the fifth optical fiber, the sixth optical fiber, the seventh optical fiber, the eighth optical fiber, and the ninth optical fiber lie in only one plane, and wherein the length of the first optical fiber is substantially parallel to the length of the fourth optical fiber, and wherein the length of the fourth optical fiber is substantially parallel to the length of the fifth optical fiber, and wherein the length of the fifth optical fiber is substantially parallel to the length of the sixth optical fiber, and wherein the length of the sixth optical fiber is substantially parallel to the length of the seventh optical fiber, and wherein the length of the seventh optical fiber is substantially parallel to the length of the eighth optical fiber, and wherein the length of the eighth optical fiber is substantially parallel to the length of the ninth optical fiber, and wherein the nut is made of a metallic material which is non-magnetic.

2. The connector according to claim 1 wherein the O-ring is made of an elastomeric material.

3. The connector according to claim 1 wherein the O-ring is made of a metallic material.

4. The connector according to claim 3 wherein the metallic material is made of a silver compound.

5. The connector according to claim 3 wherein the metallic material is made of an indium compound.

6. The connector according to claim 1 wherein the metallized portion of the first optical fiber is made of nickel over chromium.

7. The connector according to claim 6 wherein the nickel over chromium of the metallized portion of the first optical fiber is formed on the first optical fiber by a vacuum evaporation process.

8. The connector according to claim 1 wherein the metallized portion of the first optical fiber is soldered to the aperture of the surface of the body.

9. The connector according to claim 1 wherein the connector, near the second end of the first optical fiber, being adapted so as to receive a MP connector.

10. A connector for mounting to and through a wall of a device, the connector comprising:

a body having a surface, the surface having an aperture, the body having a threaded region;

a first optical fiber having a length, the first optical fiber having a first end and a second end, a portion of the length of the first optical fiber being metallized so as to form a metallized portion, the first optical fiber passing through the aperture of the surface of the body, the metallized portion attached to the aperture of the surface of the body so as to form a hermetic seal between the first optical fiber and the aperture of the surface of the body;

a fourth optical fiber having a length, a portion of the length of the fourth optical fiber being metallized so as to form a metallized portion, the fourth optical fiber passing through the aperture of the surface of the body, the metallized portion attached to the aperture of the surface of the body so as to form a hermetic seal between the fourth optical fiber and the aperture of the surface of the body;

a fifth optical fiber having a length, a portion of the length of the fifth optical fiber being metallized so as to form a metallized portion, the fifth optical fiber passing through the aperture of the surface of the body, the metallized portion attached to the aperture of the surface of the body so as to form a hermetic seal between the fifth optical fiber and the aperture of the surface of the body;

a sixth optical fiber having a length, a portion of the length of the sixth optical fiber being metallized so as to form a metallized portion, the sixth optical fiber passing through the aperture of the surface of the body, the metallized portion attached to the aperture of the surface of the body so as to form a hermetic seal between the sixth optical fiber and the aperture of the surface of the body;

a seventh optical fiber having a length, a portion of the length of the seventh optical fiber being metallized so as to form a metallized portion, the seventh optical fiber passing through the aperture of the surface of the body, the metallized portion attached to the aperture of the surface of the body so as to form a hermetic seal between the seventh optical fiber and the aperture of the surface of the body;

an eighth optical fiber having a length, a portion of the length of the eighth optical fiber being metallized so as to form a metallized portion, the eighth optical fiber passing through the aperture of the surface of the body, the metallized portion attached to the aperture of the surface of the body so as to form a hermetic seal between the eighth optical fiber and the aperture of the surface of the body;

a ninth optical fiber having a length, a portion of the length of the ninth optical fiber being metallized so as to form a metallized portion, the ninth optical fiber passing through the aperture of the surface of the body, the metallized portion attached to the aperture of the surface of the body so as to form a hermetic seal between the ninth optical fiber and the aperture of the surface of the body;

a sealant located between the body and the wall of the device so as to provide a hermetic seal between the body and the wall of the device when the body is urged toward the wall of the device and wherein the sealant is deformed, and whereby an optical signal can be transmitted within the first optical fiber through the body, and whereby the first end of the first optical fiber is hermetically sealed from the second end of the first optical fiber when the sealant is deformed; and a nut mounted on the body so as to trap a portion of the wall of the device therebetween, the nut having a threaded region, and wherein the threaded region of the nut is complementary to and mates with the threaded region of the body, and wherein the connector, at the first end of the first optical fiber, being adapted so as to receive a second optical fiber where the second optical fiber and the first optical fiber are in optical communication, and wherein the connector, at the second end of the first optical fiber, being adapted so as to receive a third optical fiber where the third optical fiber and the first optical fiber are in optical communication, and whereby the second optical fiber and the third optical are in optical communication when the second optical fiber and the first optical fiber are in optical communication and the first optical fiber and the third optical fiber are in optical communication, and wherein the body includes a groove, the groove circumscribes the aperture of the surface of the body, and wherein the sealant substantially lies in the groove, and wherein the sealant is an O-ring, and wherein the body has a cylindrically shaped portion, the cylindrically shaped portion of the body has a diameter equal to or less than one inch, and wherein the connector, near the first end of the first optical fiber, being adapted so as to form a MP coupling, and wherein the first optical fiber, the fourth optical fiber, the fifth optical fiber, the sixth optical fiber, the seventh optical fiber, the eighth optical fiber, and the ninth optical fiber lie in only one plane, and wherein the length of the first optical fiber is substantially parallel to the length of the fourth optical fiber, and wherein the length of the fourth optical fiber is substantially parallel to the length of the fifth optical fiber, and wherein the length of the fifth optical fiber is substantially parallel to the length of the sixth optical fiber, and wherein the length of the sixth optical fiber is substantially parallel to the length of the seventh optical fiber, and wherein the length of the seventh optical fiber is substantially parallel to the length of the eighth optical fiber, and wherein the length of the eighth optical fiber is substantially parallel to the length of the ninth optical fiber, and wherein the nut is made of a metallic material which is non-magnetic.

11. The connector according to claim 10 wherein the connector, near the second end of the first optical fiber, being adapted so as to form a MP coupling.

* * * * *